United States Patent
Kim et al.

(10) Patent No.: US 8,711,702 B2
(45) Date of Patent: Apr. 29, 2014

(54) LIGHTWEIGHT MULTICAST METHOD AND APPARATUS FOR DATA DISTRIBUTION SERVICE

(75) Inventors: Kyeong-Tae Kim, Chuncheon-si (KR); Soo-Hyung Lee, Daejeon (KR); Hyung-Kook Jun, Seoul (KR); Jae-Hyuk Kim, Seoul (KR); Won-Tae Kim, Daejeon (KR); Seung-Min Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 146 days.

(21) Appl. No.: 13/330,623

(22) Filed: Dec. 19, 2011

(65) Prior Publication Data

US 2012/0155269 A1    Jun. 21, 2012

(30) Foreign Application Priority Data

Dec. 20, 2010    (KR) .................. 10-2010-0131003

(51) Int. Cl.
 *G06F 11/00*    (2006.01)
 *H04J 3/16*    (2006.01)

(52) U.S. Cl.
 USPC .......................................... 370/237; 370/229

(58) Field of Classification Search
 USPC .......... 370/229–237, 242–252, 310–350, 390
 See application file for complete search history.

(56) References Cited

U.S. PATENT DOCUMENTS

| | | | | |
|---|---|---|---|---|
| 6,256,022 B1* | 7/2001 | Manaresi et al. | | 345/174 |
| 7,035,217 B1* | 4/2006 | Vicisano et al. | | 370/236 |
| 7,058,723 B2* | 6/2006 | Wilson | | 709/235 |
| 7,274,661 B2* | 9/2007 | Harrell et al. | | 370/229 |
| 7,724,656 B2* | 5/2010 | Sàgfors et al. | | 370/229 |
| 2007/0076598 A1* | 4/2007 | Atkinson et al. | | 370/229 |
| 2009/0180379 A1* | 7/2009 | Leung et al. | | 370/231 |
| 2010/0020721 A1* | 1/2010 | Parker et al. | | 370/254 |
| 2011/0255410 A1* | 10/2011 | Yamen et al. | | 370/237 |
| 2011/0267948 A1* | 11/2011 | Koc et al. | | 370/235 |
| 2011/0273983 A1* | 11/2011 | Bergamasco et al. | | 370/232 |

FOREIGN PATENT DOCUMENTS

| | | |
|---|---|---|
| KR | 1020090084970 A | 8/2009 |
| KR | 1020100070361 A | 6/2010 |

* cited by examiner

*Primary Examiner* — Warner Wong

(57) ABSTRACT

The present invention provides a lightweight multicast method and apparatus for a data distribution service. The lightweight multicast apparatus includes a network congestion detection unit for multicasting packets to a plurality of subscriber node terminals, and detecting a cause of network congestion using a negative response message transferred from a relevant subscriber node terminal that could not receive the packets among the plurality of subscriber node terminals. A network recovery control unit determines a recovery control policy depending on the cause of the congestion detected by the network congestion detection unit, and solves the cause of the congestion.

18 Claims, 6 Drawing Sheets

| | CCTT OF SUBSCRIBER NODE TERMINAL 600 | | |
|---|---|---|---|
| PUBLISHER NODE TERMINAL | PUB(400a) | PUB(400a) | PUB(400b) |
| ROUTE FIELD (FD1) | PUB(400a)-INT(500a)-SUB(600) | PUB(400a)-PUB(400b)-INT(500b)-SUB(600) | Pub(400b)-INT(500b)-SUB(600) |
| PACKET RECEPTION FIELD(FD2) | 36 | 28 | 19 |
| PACKET LOSS FIELD(FD3) | 2 | 5 | 14 |
| HOP COUNT FIELD(FD4) | 2 | 3 | 2 |
| MAC DELAY TIME FIELD(FD5) | T1 | T1 | T3 |
| CONGESTION FLAG FIELD(FD6) | GREEN | YELLOW | RED |

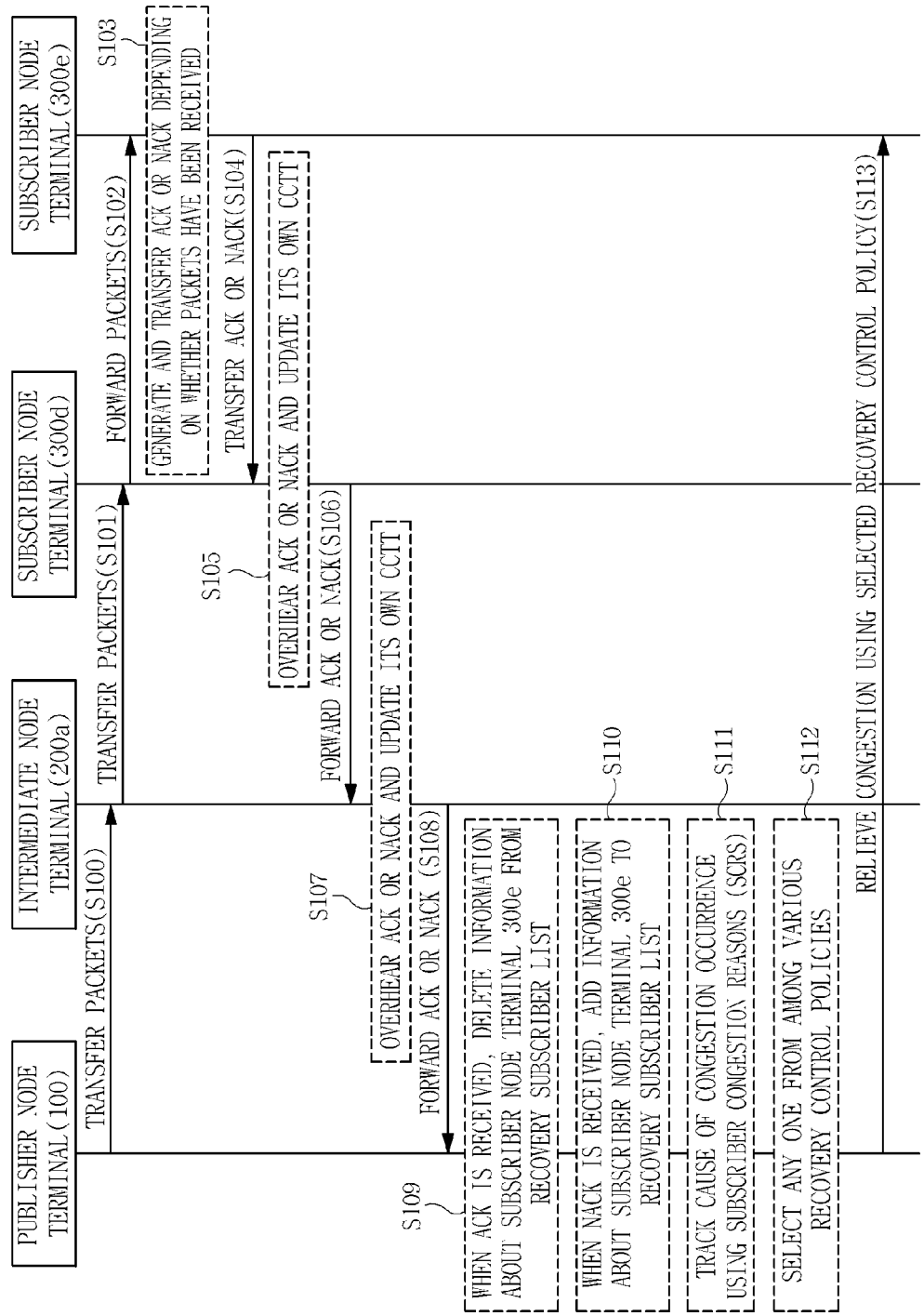

LIGHTWEIGHT MULTICAST METHOD AND APPARATUS FOR DATA DISTRIBUTION SERVICE

CROSS REFERENCE TO RELATED APPLICATION

This application claims the benefit of Korean Patent Application No. 10-2010-0131003, filed on Dec. 20, 2010, which is hereby incorporated by reference in its entirety into this application.

BACKGROUND OF THE INVENTION

1. Technical Field

The present invention relates generally to a lightweight multicast method and apparatus for a data distribution service and, more particularly, to an apparatus and method for providing a data distribution service using a lightweight multicast method that guarantees reliability among publish/subscribe (Pub/Sub) technologies.

2. Description of the Related Art

With an increase in the number of embedded systems and the evolution of mobile devices, the demand for services for delivering and distributing data in various types of ubiquitous environments has increased. Further, there has also been a gradual increase in the demand for a distribution environment in which a plurality of embedded systems dynamically configure a single network and in which the data requested by users can be transparently transmitted/received over the configured network.

At present, as a part of middleware technology for such a Data Distribution Service (DDS), pub (Publish)/Sub (Subscribe) technology based on Object Management Group (OMG) DDS standards has been mainly used in the application domain that requires real-time characteristics, such as the national defense domain. However, it can be anticipated that such Pub/Sub technology will be utilized in the future in application domains falling within various ranges such as for electronic commerce, financial services and communication services.

In order for such middleware technology to be used in large-scale networks in a variety of fields, reliability must be guaranteed. For this, a publisher must retransmit packets that a subscriber lost However, a method of simply retransmitting packets may deteriorate system performance, and the additional use of messages may also cause the problem of congestion.

SUMMARY OF THE INVENTION

Accordingly, the present invention has been made keeping in mind the above problems occurring in the prior art, and an object of the present invention is to provide a lightweight multicast method and apparatus for a data distribution service, which can detect the cause of the occurrence of congestion in a large-scale network and can relieve the congestion using the lightweight multicast method.

In accordance with an aspect of the present invention to accomplish the above object, there is provided a lightweight multicast apparatus, including a network congestion detection unit for multicasting packets to a plurality of subscriber node terminals, and detecting a cause of network congestion using a negative response message transferred from a relevant subscriber node terminal that could not receive the packets among the plurality of subscriber node terminals, and a network recovery control unit for determining a recovery control policy depending on the cause of the congestion detected by the network congestion detection unit, and solving the cause of the congestion.

Preferably, the negative response message may include a first subscriber congestion reason generated based on a cross-layered congestion tracking table of the relevant subscriber node terminal that could not receive the packets.

Preferably, the network congestion detection unit may receive an affirmative response message transferred from the relevant subscriber node terminal received the packets, and delete information about the relevant subscriber node terminal transferred the affirmative response message from a recovery subscriber list.

Preferably, the network congestion detection unit may add information about the relevant subscriber node terminal transferred the negative response message to the recovery subscriber list.

Preferably, the network congestion detection unit may receive second subscriber congestion reasons generated based on each of cross-layered congestion tracking tables of a neighboring intermediate node terminal and a neighboring subscriber node terminal included in a route for multicasting of the packets.

Preferably, the second subscriber congestion reasons may be generated by a neighboring intermediate node terminal and a neighboring subscriber node terminal in a route for multicasting of the packets based on the negative response message or the affirmative response message transferred to the network congestion detection unit.

Preferably, the network congestion detection unit may detect the cause of the network congestion using the first subscriber congestion reason and the second subscriber congestion reasons.

Preferably, the recovery control policy may include a naive recovery policy, a fast recovery policy, and a proactive recovery policy.

Preferably, the network recovery control unit may determine whether the congestion is global congestion or local congestion depending on colors for levels of congestion flags included in the first subscriber congestion reason and the second subscriber congestion reasons.

Preferably, the network recovery control unit may select the proactive recovery policy and relieves the global congestion when the congestion is the global congestion.

Preferably, the network recovery control unit may select the naive recovery policy or the fast recovery policy and relieve the local congestion when the congestion is the local congestion.

Preferably, each of the cross-layered congestion tracking tables may include a route field for routes for multicasting of the packets, a field for a number of received packets, a field for a number of lost packets, a hop count field, a Media Access Control (MAC) delay time field, and a congestion flag field.

In accordance with another aspect of the present invention to accomplish the above object, there is provided a lightweight multicast method, including a multicasting packets to a plurality of subscriber node terminals, receiving a negative response message transferred from a relevant subscriber node terminal that could not receive the packets among the plurality of subscriber node terminals, detecting a cause of network congestion using the negative response message, and determining a recovery control policy depending on the cause of the network congestion.

Preferably, the detecting the cause of the occurrence of the network congestion may include detecting a first subscriber congestion reason included in the negative response message, receiving second subscriber congestion reasons from a neighboring intermediate node terminal and a neighboring subscriber node terminal included in a route for multicasting of the packets, and detecting the cause of the network congestion using the first and second subscriber congestion reasons.

Preferably, the lightweight multicast method may further include receiving an affirmative response message transferred from a relevant subscriber node terminal received the packets among the plurality of subscriber node terminals, and deleting information about the relevant subscriber node terminal transferred the affirmative response message from a recovery subscriber list.

Preferably, the receiving the negative response message may include adding information about the relevant subscriber node terminal transferred the negative response message to the recovery subscriber list.

Preferably, the recovery control policy may include a naive recovery policy, a fast recovery policy, and a proactive recovery policy.

Preferably, the determining the recovery control policy may include determining whether the congestion is global congestion or local congestion depending on colors for levels of congestion flags included in the first subscriber congestion reason and the second subscriber congestion reasons, selecting the proactive recovery policy and then relieving the global congestion when the congestion is the global congestion, and selecting the naive recovery policy or the fast recovery policy and then relieving the local congestion when the congestion is the local congestion.

Preferably, the first subscriber congestion reason may be generated based on a cross-layered congestion tracking table of the relevant subscriber node terminal that could not receive the packets.

Preferably, the second subscriber congestion reasons may be generated based on each of cross-layered congestion tracking tables of the neighboring intermediate node terminal and the neighboring subscriber node terminal included in the route for multicasting of the packets.

According to the embodiment of the present invention, a data distribution service is provided using a lightweight multicast method that detects the cause of congestion using a cross-layered congestion detection technique and that solves the congestion using a recovery control technique. Accordingly, the present invention can exactly determine the cause of the occurrence of congestion in a large-scale network and can relieve the congestion using the minimal number of control commands, thus flexibly and dynamically coping with unpredictable variations in the environment.

Further, according to the embodiment of the present invention, various recovery control policies (naive recovery, fast recovery, proactive recovery policies) can be immediately and selectively applied using the lightweight multicast method, and congestion can be relieved while the number of control messages is minimized depending on the tracked Subscriber Congestion Reasons (SCRs). Accordingly, the present invention can improve reliability, thus enabling the data distribution service to be reliably provided in large-scale communication between embedded systems as well as mobile devices.

BRIEF DESCRIPTION OF THE DRAWINGS

The above and other objects, features and advantages of the present invention will be more clearly understood from the following detailed description taken in conjunction with the accompanying drawings, in which:

FIG. 7 is a flowchart showing the sequence of a process for detecting the cause of congestion and relieving the congestion using the lightweight multicast method according to an embodiment of the present invention.

DESCRIPTION OF THE PREFERRED EMBODIMENTS

Figure 1:
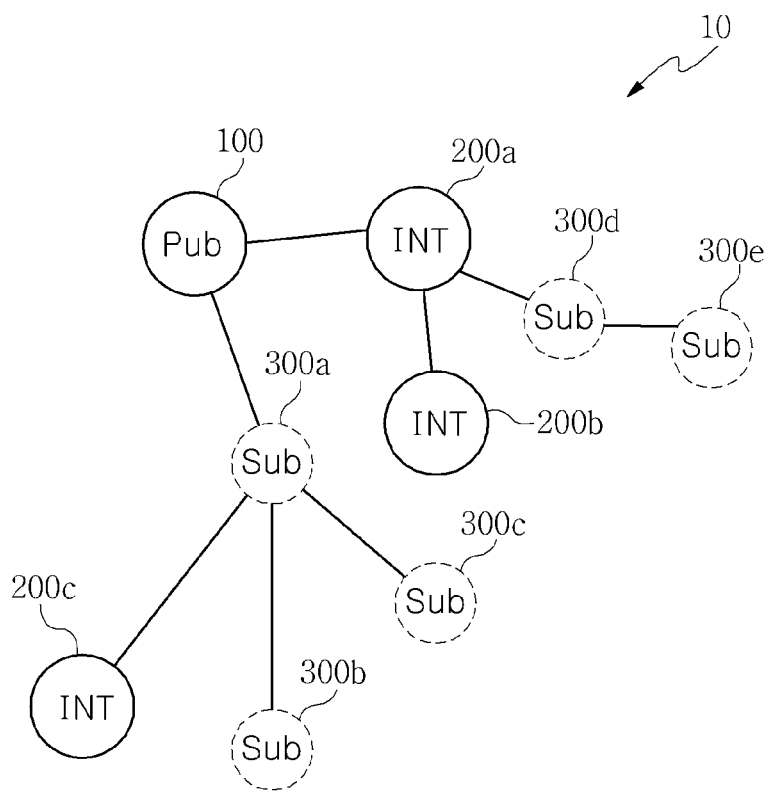
FIG. 1 is a diagram schematically showing the configuration of a network for providing lightweight multicast for a data distribution service according to an embodiment of the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Figure 2:
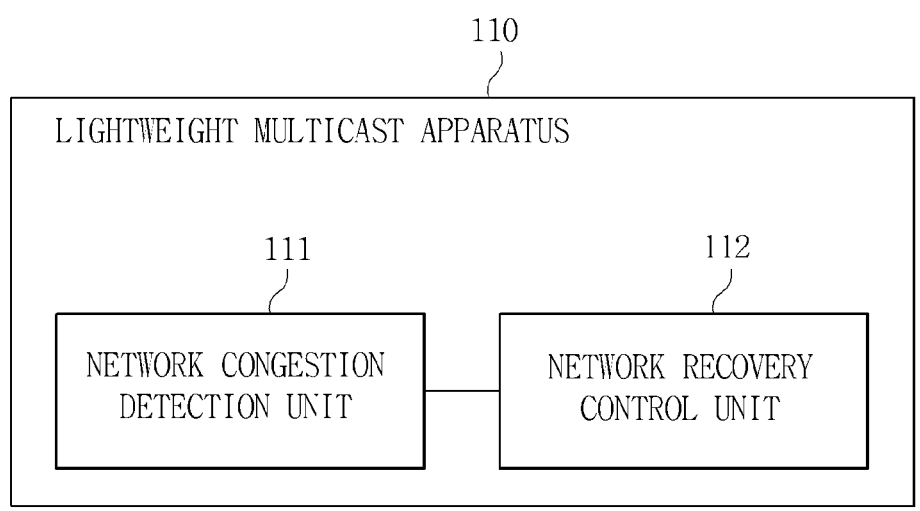
FIG. 2 is a diagram schematically showing the lightweight multicast apparatus of the publisher node terminal of FIG. 1.
Figure 3:
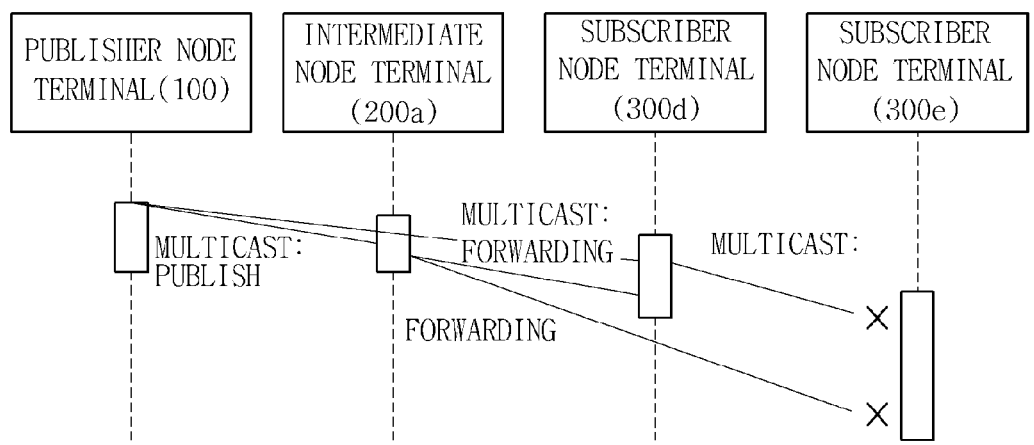
FIG. 3 is a diagram showing an example in which the publisher node terminal of FIG. 1 multicasts packets.
Figure 4:
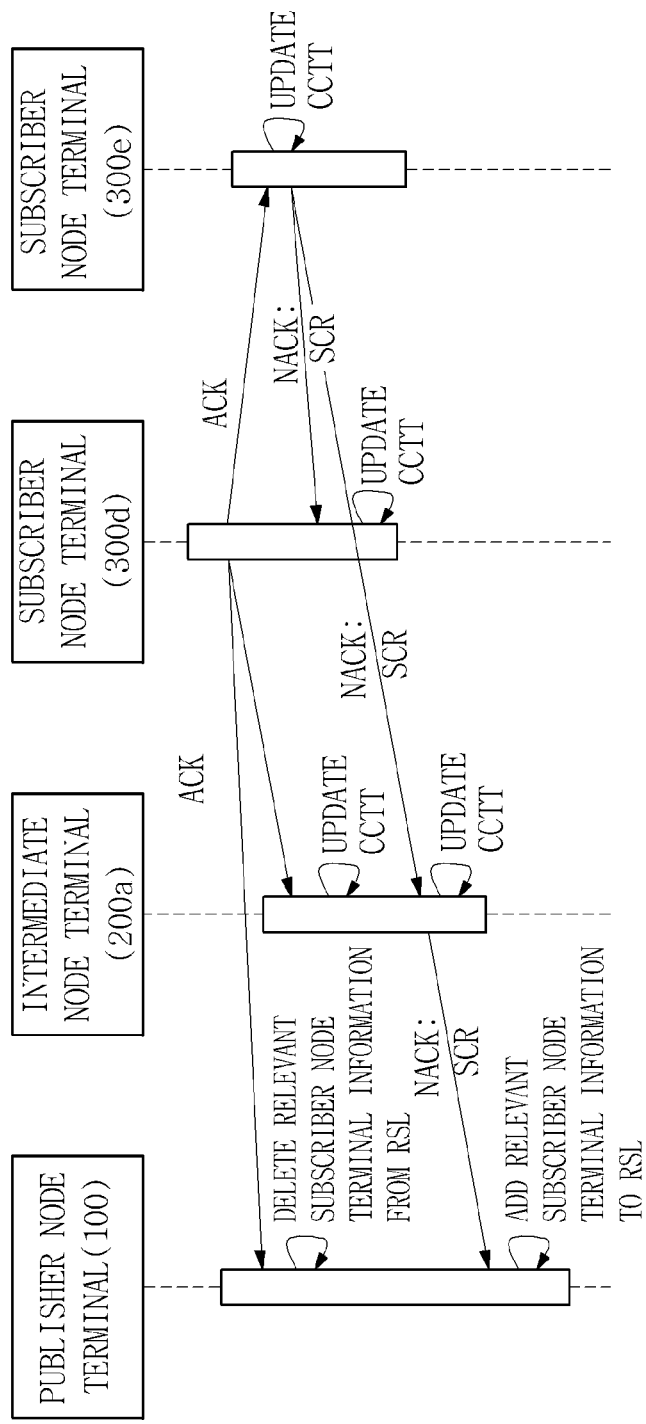
FIG. 4 is a diagram showing an example in which the subscriber node terminal of FIG. 1 multicasts a message responding to the packets.
Figure 5:
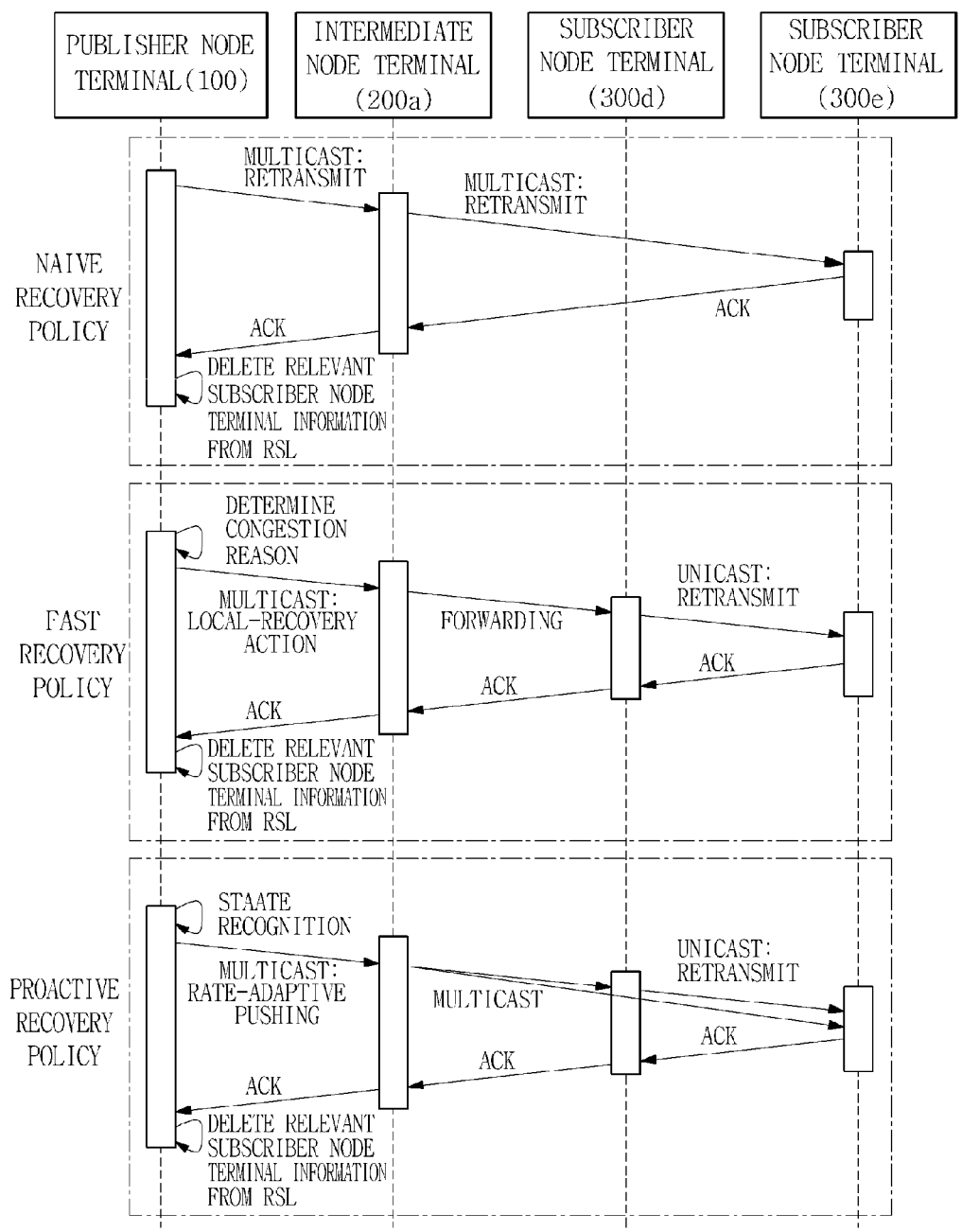
FIG. 5 is a diagram showing an example of a recovery control policy provided by the lightweight multicast apparatus of FIG. 2.

FIG. 1 is a diagram schematically showing the configuration of a network for providing lightweight multicast for a data distribution service according to an embodiment of the present invention. FIG. 2 is a diagram schematically showing the lightweight multicast apparatus of the publisher node terminal of FIG. 1. FIG. 3 is a diagram showing an example in which the publisher node terminal of FIG. 1 multicasts packets, and FIG. 4 is a diagram showing an example in which the subscriber node terminal of FIG. 1 multicasts a message responding to the packets. FIG. 5 is a diagram showing an example of a recovery control policy provided by the lightweight multicast apparatus of FIG. 2.

As shown in FIG. 1, a network 10 for detecting the cause of congestion and relieving the congestion using a lightweight multicast method according to an embodiment of the present invention includes a publisher node terminal 100, a plurality of intermediate node terminals 200a to 200c, and a plurality of subscriber node terminals 300a to 300e.

The publisher node terminal 100 multicasts a topic to the plurality of subscriber node terminals 300a to 300e. Further, the publisher node terminal 100 receives an affirmative response message (acknowledgement: ACK) or a negative response message (Negative ACK: NACK) from the plurality of subscriber node terminals 300a to 300e. The publisher node terminal 100 manages a Recovery Subscriber List (RSL) including information about subscriber node terminals, which need to be recovered because they could not receive the topic, from among the subscriber node terminals 300a to 300e, and then detects the cause of congestion and relieves the congestion. Here, the topic is a basic data structure represented in an Interface Description Language (IDL) which automatically generates the writer and the reader of an Object Management Group (OMG). Hereinafter, a topic and a packet are assumed to be identical to each other and these terms will be used interchangeably here.

In detail, referring to FIG. 2, the publisher node terminal 100 includes a lightweight multicast apparatus 110, which includes a network congestion detection unit 111 and a network recovery control unit 112.

The network congestion detection unit 111 monitors the status of congestion of the Media Access Control (MAC) layer and the network layer of the network 10 using a cross-layered congestion detection technique. That is, the network congestion detection unit 111 detects the cause of congestion by taking into consideration the buffer overflow, MAC delay time that has elapsed since an initially set delay time, the number of lost packets, etc. in the MAC layer, and also detects the cause of congestion by taking into consideration a hop count, the avoidance of hot spots, an affirmative response message ACK or a negative response message NACK, etc. in the network layer.

Such a network congestion detection unit 111 multicasts packets to the plurality of subscriber node terminals 300a to 300e, and an example of this multicast is shown in FIG. 3. In FIG. 3, the publisher node terminal 100 is assumed to multicast the packets to the subscriber node terminal 300e of the plurality of subscriber node terminals 300a to 300e.

Further, the network congestion detection unit 111 receives an affirmative response message ACK or a negative response message NACK multicasted by the plurality of subscriber node terminals 300a to 300e so as to respond to the fact whether each subscriber node terminal received the packets, and one example of the sending of these messages is shown in FIG. 4. In FIG. 4, it is assumed that the subscriber node terminal 300e of the plurality of subscriber node terminals 300a to 300e sends the affirmative response message ACK or the negative response message NACK to the publisher node terminal 100 in a multicast manner.

The negative response message NACK according to an embodiment of the present invention includes Subscriber Congestion Reason (SCR) generated based on a cross-layered congestion tracking table (hereinafter referred to as a "CCTT"). Such an SCR includes congestion in some route, the buffer overflow, a congestion flag, a hop count, the number of received packets, the number of lost packets, a MAC delay, etc. A detailed description of the CCTT will be described later.

The network congestion detection unit 111 updates a Recovery Subscriber List (RSL) when an affirmative response message ACK or a negative response message NACK is received. In detail, when the affirmative response message ACK is received, the network congestion detection unit 111 deletes information about a relevant subscriber node terminal from the RSL. When a negative response message NACK is received, the network congestion detection unit 111 adds information about a relevant subscriber node terminal to the RSL.

Further, the network congestion detection unit 111 receives Subscriber Congestion Reason (SCR) generated in such a way that each of a neighboring intermediate node terminal and a neighboring subscriber node terminal, included in a route over which the packets are transferred, overhears an affirmative response message ACK or a negative response message NACK and tracks the cause of the occurrence of congestion.

The network congestion detection unit 111 tracks the cause of the occurrence of congestion in the entire network 10 using the SCR received from a relevant subscriber node terminal and the SCRs received from the neighboring intermediate node terminal and the neighboring subscriber node terminal, and then notifies the network recovery control unit 112 of the cause of the occurrence of the congestion.

Referring to FIG. 2, the network recovery control unit 112 determines a recovery control policy using a recovery control technique so as to recover the cause of the occurrence of the congestion tracked by the network congestion detection unit 111. One example of the determination of the recovery control policy is shown in FIG. 5. The recovery control policy according to an embodiment of the present invention includes a naive recovery policy, a fast recovery policy, and a proactive recovery policy.

1) The naive recovery policy is a technique implemented such that the network recovery control unit 112 checks the states ACK/NACK of messages received from all of the subscriber node terminals, and if the message is the negative response message NACK, multicasts packets that could not be received and waits for the affirmative response message ACK to be received without sending a subsequent packet.

2) The fast recovery policy is a technique for allowing the publisher node terminal 100 to select an optimal intermediate node terminal 200a enabling a congested region to be avoided from among the plurality of intermediate node terminals 200a to 200c, and allowing the optimal intermediate node terminal 200a to retransmit the packets which could not be received, instead of the publisher node terminal 100. In this case, the optimal intermediate node terminal is selected using an algorithm that is capable of minimizing a control message and avoiding congestion according to the tracked cause of the congestion.

3) The proactive recovery policy is a technique for detecting the congestion in the network 10 and then partially alleviating congestion by controlling a packet-push rate when a control command deteriorates performance.

In order to select any one from among those recovery control policies, the network recovery control unit 112 compares the colors of congestion flag levels of the SCRs generated based on the received CCTTs. In the embodiment of the present invention, the color of a flag level for the most congested route is set to red, the color of a flag level of the least congested route is set to green, and the color of a flag level indicating congestion corresponding to a color between the red and green colors is set to yellow.

In detail, when all of the colors of the congestion flag levels of the SCRs are red, the network recovery control unit 112 regards the current congestion as global congestion of the entire network 10, and selects and applies the proactive recovery policy, thus relieving the global congestion.

In contrast, when none of the colors of the congestion flag levels of the SCRs are red, the network recovery control unit 112 regards the current congestion as local congestion, and selects and applies the naive recovery or fast recovery policy, thus relieving the local congestion.

Referring back to FIGS. 1 and 3, the plurality of intermediate node terminals 200a to 200c manage their own CCTTs, and multicast the packets transferred from the publisher node terminal 100 to relevant subscriber node terminals. Further, the plurality of intermediate node terminals 200a to 200c receive the affirmative response message ACK or the negative response message NACK transferred from the plurality of subscriber node terminals 300a to 300e, and forward the received message to the publisher node terminal 100 in a multicast manner. In this case, the intermediate node terminals 200a to 200c update their own CCTTs while forwarding the affirmative response message ACK or the negative response message NACK to the publisher node terminal 100, and track the cause of the occurrence of congestion based on the CCTTs to generate Subscriber Congestion Reasons (SCRs).

The subscriber node terminals 300a to 300e manage their own CCTTs, generate an affirmative response message ACK or a negative response message NACK depending on whether the packets multicasted by the publisher node terminal 100 have been received, and transfer the generated message.

In detail, when the multicasted packets are received, each of the subscriber node terminals 300a to 300e generates an affirmative response message ACK and transfers the generated message ACK to the publisher node terminal 100. When the multicasted packets are not received, each of the subscriber node terminals 300a to 300e generates a negative response message NACK including SCR tracked based on its own CCTT, and transfer the generated message NACK to the publisher node terminal 100.

When the lightweight multicast method according to the embodiment of the present invention is used in this way, a record is kept in the packet header of each multicasted packet whenever the packet passes through a node terminal included in the route, as in the case of Dynamic Source Routing (DSR). Accordingly, each of the publisher node terminal, the intermediate node terminals and the subscriber node terminals can check the status of the topology based on the flow of the route, and then update its own CCTT. Further, the affirmative response message ACK or the negative response message NACK is transferred in a multicast manner, but only a single subscriber node terminal and a single intermediate node terminal, for which a back path has been set, forward such a message ACK or NACK, thus solving the problem of implosion.

Hereinafter, a cross-layered congestion tracking table will be described in detail using the configuration diagram of another network according to the present invention with reference to FIG. 6.

Figure 6:
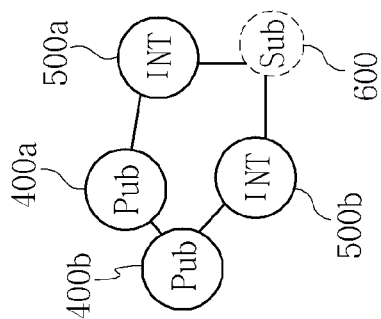
FIG. 6 is a diagram schematically showing the configuration of another network for providing lightweight multicast for a data distribution service and a cross-layered congestion tracking table according to an embodiment of the present invention.

FIG. 6 is a diagram schematically showing the configuration of another network for providing lightweight multicast for a data distribution service according to an embodiment of the present invention, and a Cross-layered Congestion Tracking Table (CCTT).

Referring to FIG. 6, another network 20 for detecting the cause of congestion and relieving the congestion using the lightweight multicast method according to the embodiment of the present invention includes publisher node terminals 400a and 400b, intermediate node terminals 500a and 500b, and a subscriber node terminal 600. In this case, since the CCTTs used to provide the data distribution service using the lightweight multicast method according to the embodiment of the present invention all have the same configuration, fields managed by each CCTT will be described in detail using the CCTT of the subscriber node terminal 600.

The CCTT of the subscriber node terminal 600 includes a route field FD1 for storing routes from the intermediate node terminals 500a and 500b, a packet reception field FD2 for storing the number of received packets, a packet loss field FD3 for storing the number of lost packets, a hop count field FD4 for storing a hop count, a delay time storage field FD5 for storing MAC delay time, and a congestion flag field FD6 for storing the colors of congestion flags.

First, the subscriber node terminal 600 receives packets through two routes, formed when the publisher node terminal 400a multicasts the packets, that is, the route [Pub 400a-INT 500a-Sub 600] and the route [Pub 400a-Pub 400b-INT 500b-Sub 600], and stores the two routes in the route field FD1. Further, the subscriber node terminal 600 receives packets through a route, formed when the publisher node terminal 400b multicasts the packets, that is, the route [Pub 400b-INT 500b-Sub 600], and stores the route, over which the packets have been received, in the route field FD1.

The subscriber node terminal 600 individually stores the number of received packets transferred from the publisher node terminal 400a and the number of received packets transferred from the publisher node terminal 400b in the packet reception field FD2.

The subscriber node terminal 600 individually stores the number of lost packets that could not be transferred from the publisher node terminal 400a and the number of lost packets that could not be transferred from the publisher node terminal 400b in the packet loss field FD3.

The subscriber node terminal 600 individually stores in the hop count field FD4 a hop count of '2' and a hop count of '3' to the publisher node terminal 400a and a hop count of '2' to the publisher node terminal 400b.

The subscriber node terminal 600 individually stores the MAC delay times of the publisher node terminals, which have elapsed since the initially set delay time, in the delay time storage field FD5.

The subscriber node terminal 600 indicates the congestion levels of routes established with the publisher node terminals 400a and 400b in colors, and then stores the corresponding colors in the congestion flag field FD6.

FIG. 7 is a flowchart showing the sequence of a process for detecting the cause of congestion and relieving the congestion using the lightweight multicast method according to the embodiment of the present invention. In FIG. 7, a description will be made on the assumption that the publisher node terminal 100 transfers packets to the subscriber node terminal 300e in the configuration of the network 10 shown in FIG. 1.

As shown in FIG. 7, in order to detect the cause of congestion and relieve the congestion using the lightweight multicast method according to the embodiment of the present invention, the publisher node terminal 100 multicasts packets to the intermediate node terminal 200a at step S100. The intermediate node terminal 200a multicasts the received packets to the subscriber node terminal 300d, and the subscriber node terminal 300d multicasts the received packets to the subscriber node terminal 300e at steps S101 and S102.

When the packets have been received, the subscriber node terminal 300e generates an affirmative response message ACK, whereas when the packets have not been received, the subscriber node terminal 300e generates a negative response message NACK including a Subscriber Congestion Reason (SCR) that has been tracked based on its own CCTT at step S103. Further, the subscriber node terminal 300e transfers the affirmative response message ACK or the negative response message NACK to the subscriber node terminal 300d at step S104.

The subscriber node terminal 300d overhears the affirmative response message ACK or the negative response message NACK and updates its own CCTT, and then generates an SCR at step S105. Further, the subscriber node terminal 300d forwards the affirmative response message ACK or the negative response message NACK to the intermediate node terminal 200a at step S106.

The intermediate node terminal 200a overhears the forwarded affirmative response message ACK or negative response message NACK and updates its own CCTT, and then generates an SCR at step S107. Furthermore, the intermediate node terminal 200a forwards the affirmative response message ACK or the negative response message NACK to the publisher node terminal 100 at step S108.

If the affirmative response message ACK has been forwarded, the publisher node terminal 100 deletes information about the subscriber node terminal 300e from the Recovery Subscriber List (RSL) at step S109.

In contrast, if the negative response message NACK has been received, the publisher node terminal 100 adds information about the subscriber node terminal 300e to the RSL at step S110. Further, the publisher node terminal 100 tracks the cause of the occurrence of the congestion using the SCR included in the negative response message NACK and the SCRs forwarded by the neighboring node terminals 200a and 300d at step S111. The publisher node terminal 100 selects one from among various recovery control policies depending on the cause of the congestion and relieves the congestion in conformity with the selected recovery control policy at steps S112 and S113.

As described above, the embodiment of the present invention provides a data distribution service using a lightweight multicast method that detects the cause of congestion using a cross-layered congestion detection technique and that solves the congestion using a recovery control technique. Accordingly, the present invention can exactly determine the cause of the occurrence of congestion in a large-scale network and can relieve the congestion using the minimal number of control commands, thus flexibly and dynamically coping with unpredictable variations in the environment.

Further, the present invention can immediately and selectively apply various recovery control policies (naive recovery, fast recovery, proactive recovery policies) using the lightweight multicast method according to the present embodiments and can relieve congestion while minimizing the number of control messages depending on the tracked Subscriber Congestion Reasons (SCRs). Accordingly, the present invention can improve reliability, thus enabling the data distribution service to be reliably provided in large-scale communication between embedded systems as well as mobile devices.

As described above, optimal embodiments of the present invention have been disclosed in the drawings and the present specification. In this case, although specific terms have been used, those terms are merely intended to describe the present invention and are not intended to limit the meanings and the scope of the present invention as disclosed in the accompanying claims. Therefore, those skilled in the art will appreciate that various modifications and other equivalent embodiments are possible from the above-description. Therefore, the technical scope of the present invention should be defined by the technical spirit of the accompanying claims.

What is claimed is:

1. A lightweight multicast apparatus, comprising:
a network congestion detection unit for multicasting packets to a plurality of subscriber node terminals, and detecting a cause of network congestion using a negative response message transferred from a relevant subscriber node terminal that could not receive the packets among the plurality of subscriber node terminals; and
a network recovery control unit for determining a recovery control policy depending on the cause of the congestion detected by the network congestion detection unit, and solving the cause of the congestion,
wherein the negative response message comprises a first subscriber congestion reason generated based on a cross-layered congestion tracking table of the relevant subscriber node terminal that could not receive the packets.

2. The lightweight multicast apparatus of claim 1, wherein the network congestion detection unit receives an affirmative response message transferred from the relevant subscriber node terminal received the packets, and deletes information about the relevant subscriber node terminal transferred the affirmative response message from a recovery subscriber list.

3. The lightweight multicast apparatus of claim 2, wherein the network congestion detection unit adds information about the relevant subscriber node terminal transferred the negative response message to the recovery subscriber list.

4. The lightweight multicast apparatus of claim 2, wherein the network congestion detection unit receives second subscriber congestion reasons generated based on each of cross-layered congestion tracking tables of a neighboring intermediate node terminal and a neighboring subscriber node terminal included in a route for multicasting of the packets.

5. The lightweight multicast apparatus of claim 4, wherein the second subscriber congestion reasons are generated by a neighboring intermediate node terminal and a neighboring subscriber node terminal included in a route for multicasting of the packets based on the negative response message or the affirmative response message transferred to the network congestion detection unit.

6. The lightweight multicast apparatus of claim 4, wherein the network congestion detection unit detects the cause of the network congestion using the first subscriber congestion reason and the second subscriber congestion reasons.

7. The lightweight multicast apparatus of claim 6, wherein the recovery control policy comprises a naive recovery policy, a fast recovery policy, and a proactive recovery policy.

8. The lightweight multicast apparatus of claim 7, wherein the network recovery control unit determines whether the congestion is global congestion or local congestion depending on colors for levels of congestion flags included in the first subscriber congestion reason and the second subscriber congestion reasons.

9. The lightweight multicast apparatus of claim 8, wherein the network recovery control unit selects the proactive recovery policy and relieves the global congestion when the congestion is the global congestion.

10. The lightweight multicast apparatus of claim 8, wherein the network recovery control unit selects the naive recovery policy or the fast recovery policy and relieves the local congestion when the congestion is the local congestion.

11. The lightweight multicast apparatus of claim 4, wherein each of the cross-layered congestion tracking tables comprises a route field for routes for multicasting of the packets, a field for a number of received packets, a field for a number of lost packets, a hop count field, a Media Access Control (MAC) delay time field, and a congestion flag field.

12. A lightweight multicast method, comprising:
multicasting packets to a plurality of subscriber node terminals;
receiving a negative response message transferred from a relevant subscriber node terminal that could not receive the packets among the plurality of subscriber node terminals;
detecting a cause of network congestion using the negative response message; and
determining a recovery control policy depending on the cause of the network congestion,
wherein the detecting the cause of the occurrence of the network congestion comprises,
detecting a first subscriber congestion reason included in the negative response message,
receiving second subscriber congestion reasons from a neighboring intermediate node terminal and a neighboring subscriber node terminal included in a route for multicasting of the packets, and detecting the cause of the network congestion using the first and second subscriber congestion reasons.

13. A lightweight multicast method, comprising:

multicasting packets to a plurality of subscriber node terminals;

receiving a negative response message transferred from a relevant subscriber node terminal that could not receive the packets among the plurality of subscriber node terminals;

detecting a cause of network congestion using the negative response message;

determining a recovery control policy depending on the cause of the network congestion;

receiving an affirmative response message transferred from a relevant subscriber node terminal received the packets among the plurality of subscriber node terminals; and deleting information about the relevant subscriber node terminal transferred the affirmative response message from a recovery subscriber list.

14. The lightweight multicast method of claim 13, wherein the receiving the negative response message comprises adding information about the relevant subscriber node terminal transferred the negative response message to the recovery subscriber list.

15. The lightweight multicast method of claim 12, wherein the recovery control policy comprises a naive recovery policy, a fast recovery policy, and a proactive recovery policy.

16. The lightweight multicast method of claim 15, wherein the determining the recovery control policy comprises:

determining whether the congestion is global congestion or local congestion depending on colors for levels of congestion flags included in the first subscriber congestion reason and the second subscriber congestion reasons;

selecting the proactive recovery policy and then relieving the global congestion when the congestion is the global congestion; and selecting the naive recovery policy or the fast recovery policy and then relieving the local congestion when the congestion is the local congestion,.

17. The lightweight multicast method of claim 12, wherein the first subscriber congestion reason is generated based on a cross-layered congestion tracking table of the relevant subscriber node terminal that could not receive the packets.

18. The lightweight multicast method of claim 12, wherein the second subscriber congestion reasons are generated based on each of cross-layered congestion tracking tables of the neighboring intermediate node terminal and the neighboring subscriber node terminal included in the route for multicasting of the packets.

* * * * *